(12) United States Patent
Wagoner et al.

(10) Patent No.: US 10,283,964 B2
(45) Date of Patent: May 7, 2019

(54) PREDICTIVE CONTROL FOR ENERGY STORAGE ON A RENEWABLE ENERGY SYSTEM

(71) Applicant: General Electric Company, Schenectady, NY (US)

(72) Inventors: Robert Gregory Wagoner, Roanoke, VA (US); Sujan Kumar Pal, Bangalore (IN)

(73) Assignee: General Electric Company, Schenectady, NY (US)

( * ) Notice: Subject to any disclaimer, the term of this patent is extended or adjusted under 35 U.S.C. 154(b) by 561 days.

(21) Appl. No.: 14/788,902

(22) Filed: Jul. 1, 2015

(65) Prior Publication Data

US 2017/0005470 A1    Jan. 5, 2017

(51) Int. Cl.
| | |
|---|---|
| H02J 3/28 | (2006.01) |
| G06Q 10/04 | (2012.01) |
| H02J 3/32 | (2006.01) |
| H02J 3/38 | (2006.01) |
| F03D 7/04 | (2006.01) |

(Continued)

(52) U.S. Cl.
CPC ............... *H02J 3/28* (2013.01); *F03D 7/042* (2013.01); *G05B 15/02* (2013.01); *G06Q 10/04* (2013.01); *G06Q 50/06* (2013.01); *H02J 3/32* (2013.01); *H02J 3/386* (2013.01); *Y02E 10/763* (2013.01); *Y02E 70/30* (2013.01); *Y04S 10/54* (2013.01)

(58) Field of Classification Search
CPC ..... G05B 15/02; H02J 3/28; H02J 3/32; H02J 3/386

USPC .................................................. 700/286, 287
See application file for complete search history.

(56) References Cited

U.S. PATENT DOCUMENTS

| | | | |
|---|---|---|---|
| 5,703,468 A | * | 12/1997 | Petrillo ................. H01M 10/44 320/101 |
| 2002/0084655 A1 | | 7/2002 | Lof et al. |
| 2004/0207207 A1 | | 10/2004 | Stahlkopf |

(Continued)

FOREIGN PATENT DOCUMENTS

| | | |
|---|---|---|
| CN | 101662244 A | 3/2010 |
| JP | 2014140281 A | 7/2014 |

OTHER PUBLICATIONS

Balint Hartmann, et al., "Cooperation of a Grid-Connected Wind Farm and an Energy Storage Unit Demonstration of a Simulation Tool", IEEE Transactions on Sustainable Energy, vol. 3, No. 1, pp. 49-56, XP011389416, Jan. 1, 2012.

(Continued)

*Primary Examiner* — Chun Cao
(74) *Attorney, Agent, or Firm* — Dority & Manning, P.A.

(57) ABSTRACT

Systems and methods for controlling the state of charge of an energy storage system used in conjunction with a renewable energy source or other power generation system are provided. More particularly, a future output requirement of the energy storage system can be predicted based at least in part on data indicative of anticipated conditions, such as weather conditions, wake conditions, or other suitable conditions. A control system can adjust a state of charge setpoint from a nominal setpoint (e.g. 50%) to an adjusted setpoint based at least in part on the future output requirement. In this way, the energy storage system can better accommodate the output requirements of the energy storage system during varying weather conditions.

18 Claims, 6 Drawing Sheets

(51) Int. Cl.
*G05B 15/02* (2006.01)
*G06Q 50/06* (2012.01)

(56) References Cited

U.S. PATENT DOCUMENTS

| 2013/0002190 | A1* | 1/2013 | Ogura | H01M 10/44 |
| | | | | 320/101 |
| 2013/0190939 | A1* | 7/2013 | Lenox | H02J 3/32 |
| | | | | 700/291 |
| 2013/0314022 | A1* | 11/2013 | Ishibashi | H02J 7/007 |
| | | | | 320/101 |
| 2015/0180323 | A1 | 6/2015 | Wagoner et al. | |
| 2015/0248118 | A1* | 9/2015 | Li | G05B 13/04 |
| | | | | 700/295 |
| 2015/0372510 | A1 | 12/2015 | Murata et al. | |
| 2016/0336768 | A1* | 11/2016 | Le Paven | B60L 11/1851 |

OTHER PUBLICATIONS

European Search Report and Opinion issued in connection with corresponding EP Application No. 16175344.7 dated Nov. 3, 2016.

\* cited by examiner

PREDICTIVE CONTROL FOR ENERGY STORAGE ON A RENEWABLE ENERGY SYSTEM

FIELD OF THE INVENTION

The present subject matter relates generally to renewable energy systems, and more particularly, to systems and methods for controlling energy storage systems used in conjunction with renewable energy sources.

BACKGROUND OF THE INVENTION

Renewable energy systems, such as wind turbine systems, solar power systems, etc., have increasingly been used for power generation throughout the world. Renewable energy power systems, such as wind energy power systems and solar energy power systems, can include a power converter configured to convert energy generated by the renewable energy source (e.g. a wind-driven generator, a photovoltaic array, etc.) into suitable energy for application to an AC grid.

Energy storage systems, such as battery energy storage systems, have been used in conjunction with renewable energy systems to reduce transients in energy produced by the renewable energy systems due to, for instance, varying wind conditions, varying sunlight conditions, etc. For instance, during periods of increased energy production resulting from increased wind conditions, the extra energy produced by the renewable energy source can be stored in the energy storage system, for instance, by charging batteries in the energy storage system. During periods of decreased energy production resulting from decreased wind conditions, the energy storage system can be used to supplement the energy produced by the renewable energy source, for instance, by discharging batteries in the energy storage system.

Control schemes for controlling a state of charge of an energy storage system in conjunction with the renewable energy system typically do not store energy up to a maximum available capacity (e.g. maximum state of charge) of the energy storage devices. Typically, control schemes are set up to operate the renewable energy system so that it can deliver a constant amount of energy for short durations of time. The energy storage devices can be maintained at a state of charge level that is less than then the maximum state of charge. In this way, the energy storage devices can be operated to either absorb or deliver energy as necessary to keep the output of the renewable energy system relatively constant. In some circumstances, however, there is not enough stored energy in the energy storage devices to accommodate what is needed to support the desired output power of the renewable energy system.

Thus, a need exists for a control scheme for controlling the state of charge of the energy storage system to increase the capability of the energy storage system to support energy requirements of the renewable energy system.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method for controlling an energy storage system associated with a power generation system The method includes accessing, by one or more control devices, data indicative of anticipated conditions for a predetermined period and determining, by the one or more control devices a future output requirement of the energy storage system for the predetermined time period based at least in part on the data indicative of anticipated weather conditions. The method further includes adjusting, by the one or more computing devices, a state of charge setpoint for the energy storage system based at least in part on the future output requirement; and controlling, by the one or more computing devices, the delivery of power to or from the energy storage system based at least in part on the state of charge setpoint.

Another example aspect of the present disclosure is directed to a control system for controlling an energy storage system associated with a renewable energy system. The control system includes a state of charge adjustment module implemented by one or more control devices. The state of charge adjustment module is configured to adjust a state of charge setpoint for the energy storage system based at least in part on data indicative of anticipated weather conditions. The control system further includes a renewable energy control module implemented by the one or more control devices. The renewable energy control module is configured to generate a power command for the renewable energy system based at least in part on the state of charge setpoint and a current state of charge for the energy storage system. The control system further includes a charge controller implemented by the one or more control devices. The charge controller is configured to control the delivery of power to or from the energy storage system based at least in part on the state of charge setpoint.

Yet another example aspect of the present disclosure is directed to a wind turbine system. The wind turbine system includes a wind driven generator and a power converter coupled to the wind driven generator. The power converter includes a DC bus. The system further includes a battery energy storage system coupled to the DC bus of the power converter. The battery energy storage system includes one or more battery cells. The system further includes a control system configured to control the delivery of power to or from the battery energy storage system based at least in part on a state of charge setpoint. The control system is configured to adjust the state of charge setpoint for the battery energy storage system based at least in part on data indicative of anticipated weather conditions for a predetermined time period.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
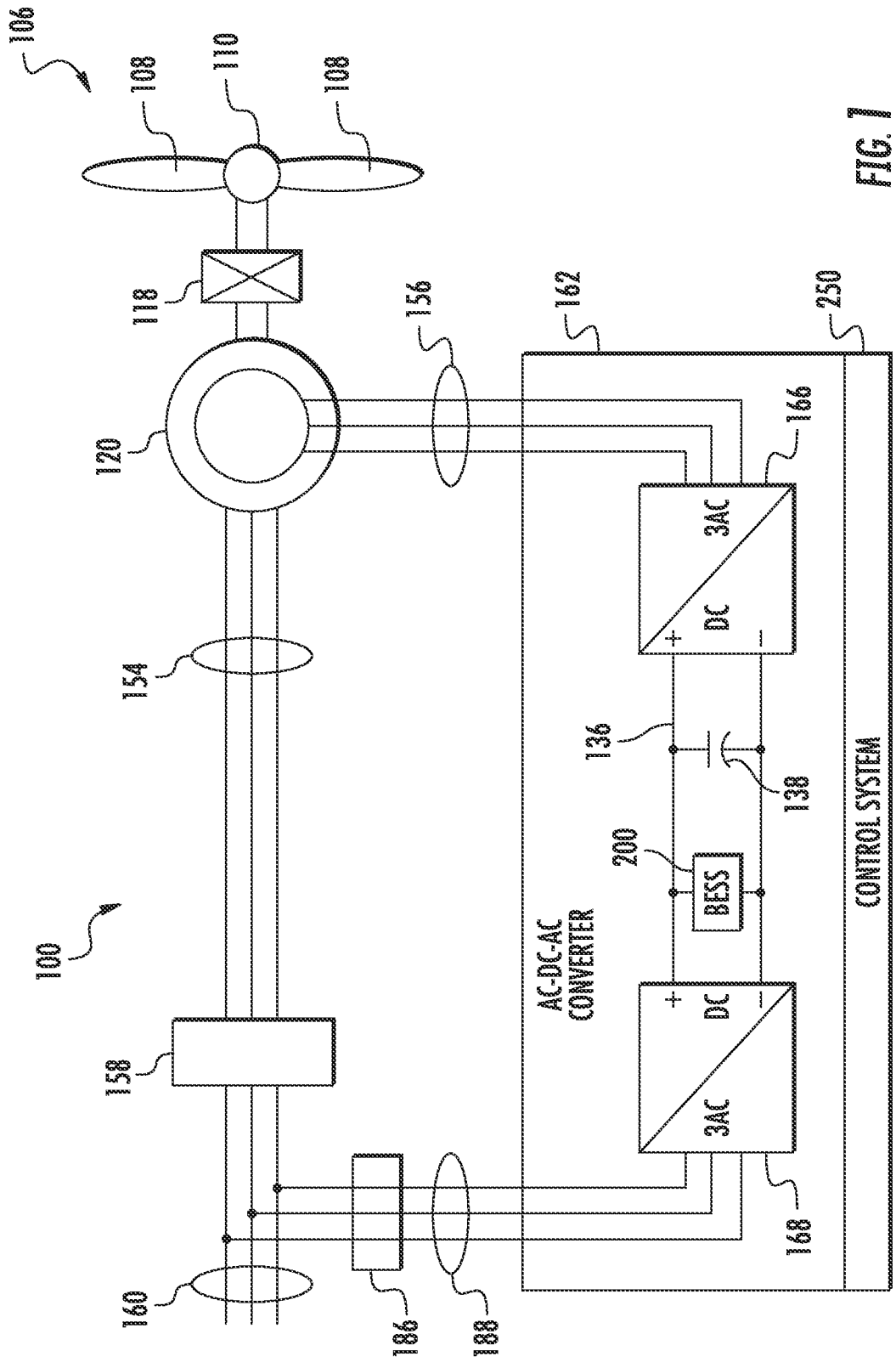
FIG. 1 depicts example renewable energy system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed systems and methods for controlling an energy storage system used in conjunction with a power generation system, such as a renewable energy system. Embodiments of the present disclosure will be discussed with reference to energy storage systems used in conjunction with wind energy systems for purposes of illustration and discussion. Those of ordinary skill in the art, using the disclosures provided herein, will understand that example aspects of the present disclosure can be used with other renewable energy systems and power generation systems, such as solar power generation systems (e.g. photovoltaic arrays), and other renewable energy systems or power generation systems (e.g. gas turbine systems).

A renewable energy system can include an energy storage system that is used to reduce transients in energy production of the renewable energy system. Energy storage systems can be used to absorb or delivery energy as necessary to keep the energy output of the renewable energy system constant. As an example, a battery energy storage system can provide power to supplement a decrease in energy production from a wind turbine due to, for instance, a decrease in wind speed.

A control system can be used to maintain a state of charge of the energy storage system. The state of charge of the energy storage system is a measure of the amount of stored energy in the energy storage system. For instance, a state of charge of 100% can indicate that the energy storage system is fully charged or is storing energy up to its maximum available capacity. A state of charge of 0% can indicate that the energy stored in the energy storage system is fully depleted.

A control system can control the state of charge of the energy storage system based on a state of charge setpoint. The state of charge setpoint provides a desired state of charge for the energy storage system based on various conditions. In some instances, the state of charge setpoint can be set to a value between 0% and 100%, such as between 20% and 80%, such as between 40% and 60%, such as 50% to increase life of the energy storage system. However, an energy storage system maintained at less than full capacity (e.g. 50%) may be excessively depleted (e.g. less than 10% state of charge) when providing extra power to supplement the energy production of a renewable energy system. As a result, larger and more expensive energy storage systems (e.g. larger batteries) can be required to accommodate the transients of the renewable energy system when the state of charge is maintained at less than full capacity.

According to example embodiments of the present disclosure, a control system can be used to control the state of charge of the energy storage system based at least in part on data indicative of anticipated conditions. The data indicative of anticipated conditions can include data indicative of anticipated weather conditions (e.g. wind speed), wake conditions, power demand conditions, or other suitable anticipated conditions. A future output requirement of the energy storage system can be predicted based at least in part on the data indicative of anticipated weather conditions. A control system can adjust a state of charge setpoint from a nominal setpoint (e.g. 50%) to an adjusted setpoint based at least in part on the future output requirement. For instance, if the data indicative of anticipated weather conditions indicates that increased output will be needed from the energy storage system, the state of charge of the energy storage system can be increased to accommodate the predicted future output requirement. In this way, the energy storage system can better accommodate the output requirements during inclement weather conditions. In addition, because the state of charge setpoint is adjusted to accommodate future output requirements, smaller energy storage systems can be used in conjunction with the renewable energy system while maintaining steady energy production from the renewable energy system.

With reference now to the FIGS., example embodiments of the present disclosure will now be discussed in detail. FIG. 1 depicts an example wind driven doubly-fed induction generator (DFIG) system 100. Example aspects of the present disclosure are discussed with reference to the DFIG wind turbine system 100 of FIG. 1 for purposes of illustration and discussion. Those of ordinary skill in the art, using the disclosures provided herein, should understand that example aspects of the present disclosure are also applicable in other power systems, such as a wind, solar, or other suitable power generation system.

In the example system 100, a rotor 106 includes a plurality of rotor blades 108 coupled to a rotating hub 110, and together define a propeller. The propeller is coupled to an optional gear box 118, which is, in turn, coupled to a generator 120. In accordance with aspects of the present disclosure, the generator 120 is a doubly fed induction generator (DFIG) 120.

DFIG 120 is typically coupled to a stator bus 154 and a power converter 162 via a rotor bus 156. The stator bus 154 provides an output multiphase power (e.g. three-phase power) from a stator of DFIG 120 and the rotor bus 156 provides an output multiphase power (e.g. three-phase power) of a rotor of the DFIG 120. Referring to the power converter 162, DFIG 120 is coupled via the rotor bus 156 to a rotor side converter 166. The rotor side converter 166 is coupled to a line side converter 168 which in turn is coupled to a line side bus 188.

In example configurations, the rotor side converter 166 and the line side converter 168 are configured for normal operating mode in a three-phase, pulse width modulation (PWM) arrangement using insulated gate bipolar transistor (IGBT) switching elements. The rotor side converter 166 and the line side converter 168 can be coupled via a DC bus 136 across which is the DC bus capacitor 138.

The power converter 162 can be coupled to a control system 250 to control the operation of the rotor side converter 166 and the line side converter 168 and other aspects of the power system 100. The control system 250 can include any number of control devices. In one implementation, the control system 174 can include a processing device (e.g. microprocessor, microcontroller, etc.) executing computer-readable instructions stored in a computer-readable medium. The instructions when executed by the processing device can cause the processing device to perform operations, including providing control commands (e.g. pulse width modulation commands) to the switching elements of the power converter 162 and in other aspects of the power system 100, such as a converter used in an energy storage system 200.

In operation, alternating current power generated at DFIG 120 by rotation of the rotor 106 is provided via a dual path to electrical grid 160. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC bus 136. Switching elements (e.g. IGBTs) used in bridge circuits of the rotor side power converter 166 can be modulated to convert the AC power provided from the rotor bus 156 into DC power suitable for the DC bus 136.

The line side converter 168 converts the DC power on the DC bus 136 into AC output power suitable for the electrical grid 160. In particular, switching elements (e.g. IGBTs) used in bridge circuits of the line side power converter 168 can be modulated to convert the DC power on the DC bus 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 160 (e.g. 50 Hz/60 Hz).

Various circuit breakers and switches, such as switch, 158, a converter breaker 186, can be included in the system 100 to connect or disconnect corresponding buses, for example, when current flow is excessive and can damage components of the wind turbine system 100 or for other operational considerations. Additional protection components can also be included in the wind turbine system 100.

The power converter 162 can receive control signals from, for instance, the control system 250. The control signals can be based, among other things, on sensed conditions or operating characteristics of the wind turbine system 100. The control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

According to example aspects of the present disclosure, a battery energy storage system 200 can be coupled to the power converter 162 of the power system 100. The present disclosure is discussed with reference to a battery energy storage system for purposes of illustration and discussion. Those of ordinary skill in the art, using the disclosures provided herein, should understand that aspects of the present disclosure are also applicable in other energy storage systems (e.g. fuel cells, capacitor banks, etc.).

The battery energy storage system 200 can be coupled to the DC bus 136 of the power converter 162. The energy storage system 200 can be used to provide power to the DC bus 136 under certain conditions. For instance, the energy storage system 200 can be used to provide power to the DC bus 136 to increase output of the power system 100 when wind speed drops. Power can also be supplied and stored in the energy storage system 200 during operation of the DFIG system 100.

Figure 2:
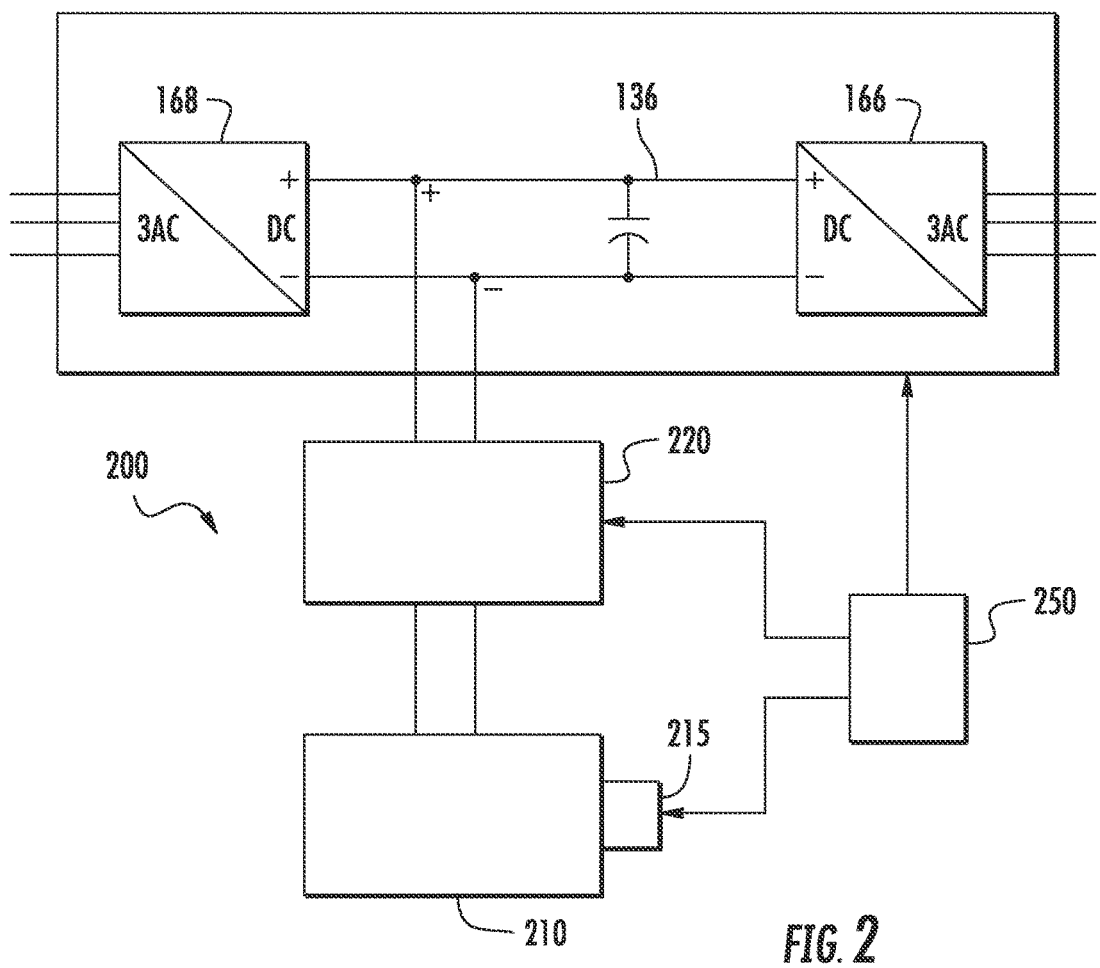
FIG. 2 depicts an example energy storage system associated with a renewable energy system according to example embodiments of the present disclosure.

FIG. 2 depicts an example battery energy storage system (BESS) 200 coupled to the DC bus 136 of a power converter 162. The BESS 200 can include one or more battery energy storage devices 210, such battery cells or battery packs. The battery energy storage devices 210 can contain one or more sodium nickel chloride batteries, sodium sulfur batteries, lithium ion batteries, nickel metal hydride batteries, or other similar devices.

The BESS 200 can include a battery management system (BMS) 215. The BMS 215 can include one or more electronic devices that monitor one or more of the battery energy storage devices 210, such as by protecting the battery energy storage device from operating outside a safe operating mode, monitoring a state of the battery energy storage device, calculating and reporting operating data for the battery energy storage device, controlling the battery energy storage device environment, and/or any other suitable control actions. For example, in several embodiments, the BMS 215 is configured to monitor and/or control operation of one or more energy storage devices 210. The BMS 215 can be, for example, a logic controller implemented purely in hardware, a firmware-programmable digital signal processor, or a programmable processor-based software-controlled computer.

The BESS 200 can be coupled to a converter 220. The converter 220 can be a DC to DC converter 220 such as a buck converter, boost converter, or buck/boost converter. The converter 220 can convert a DC voltage at the DC bus 136 to a suitable DC voltage for providing power to or receiving power from the BESS 200. The converter 220 can include one or more electronic switching elements, such as insulated gate bipolar transistors (IGBT). The electronic switching elements can be controlled (e.g. using pulse width modulation) to charge or to discharge the BESS 200. In addition, the electronic switching elements can be controlled to condition DC power received or provided to the BESS 200.

The control system 250 can be configured to control the converter 220 to charge or discharge the battery energy storage devices 210 in accordance with a state of charge setpoint. The state of charge setpoint can be determined based at least in part on data indicative of future weather conditions so that the BESS 200 can accommodate future output requirements determined based at least in part on the data indicative of future weather conditions.

Figure 3:
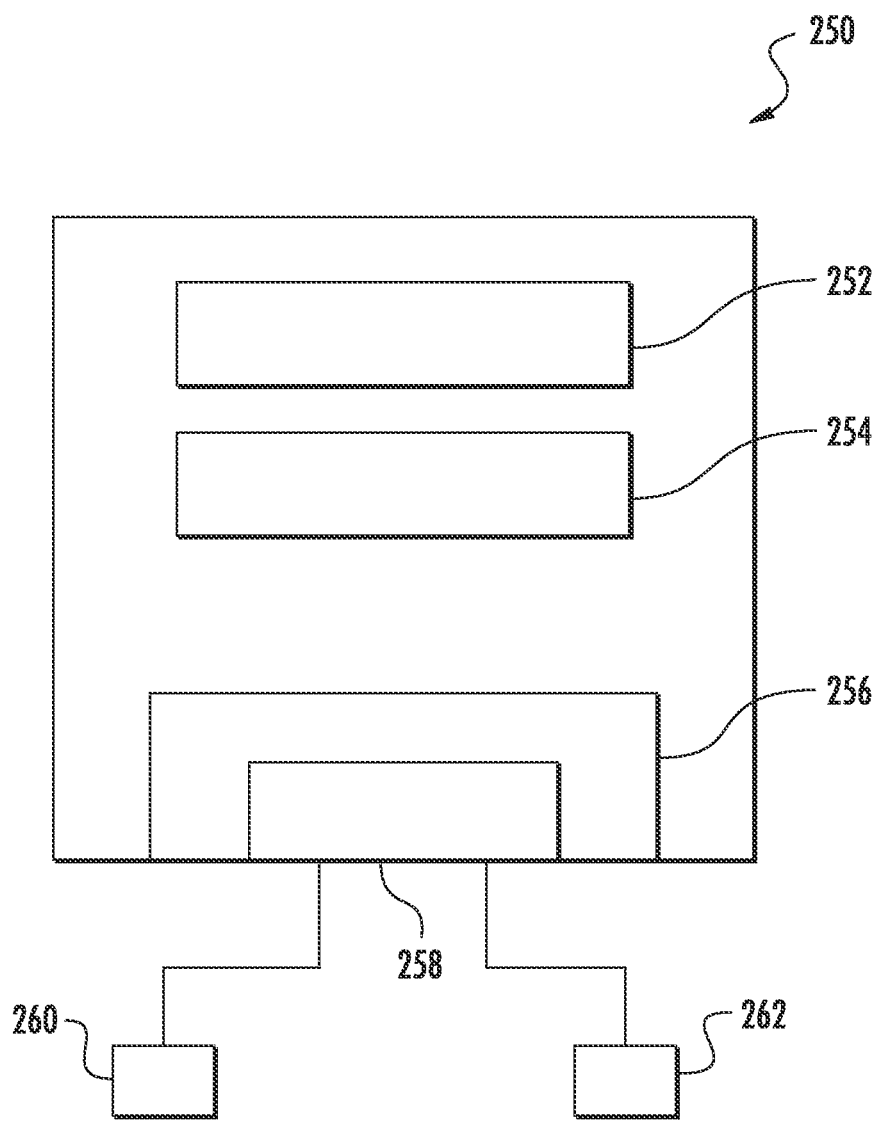
FIG. 3 depicts an example control system according to example embodiments of the present disclosure.

Referring particularly to FIG. 3, the control system 250 can include any number of suitable control devices. The controller 250 can be a farm level controller or a controller of one or more individual wind turbines. As shown, for example, the control system 250 can include one or more processor(s) 252 and one or more memory device(s) 254 configured to perform a variety of computer-implemented functions and/or instructions (e.g., performing the methods, steps, calculations and the like and storing relevant data as disclosed herein). The instructions when executed by the processor(s) 252 can cause the processor(s) 252 to perform operations according to example aspects of the present disclosure. For instance, the instructions when executed by the processor(s) 252 can cause the processor(s) 252 to implement one or more control modules, such as a state of charge adjustment module, a renewable energy control module, a charge control module, etc.

Additionally, the control system 250 can include a communications module 256 to facilitate communications between the controller 250 and the various components of the system 100. Further, the communications module 256 can include a sensor interface 258 (e.g., one or more analog-to-digital converters) to permit signals transmitted from one or more sensors 260, 262 to be converted into signals that can be understood and processed by the processors 252. It should be appreciated that the sensors (e.g. sensors 260, 262) can be communicatively coupled to the communications module 258 using any suitable means, such as a wired or wireless connection. The signals can be communicated using any suitable communications protocol.

The processor(s) 252 can be configured to receive one or more signals from the sensors 260 and 262. For instance, the processor(s) 252 can receive signals indicative of the state of charge of the energy storage system from sensor 260, such as a monitoring device configured to monitor a state of charge of the energy storage devices in the energy storage system. The processor(s) 252 can receive signals indicative of power delivery (e.g. amount of power charging/discharging) from sensor 262.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 252 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 254 can generally be configured to store suitable computer-readable instructions that, when implemented by the processor(s) 252, configure the control system 250 to perform the various functions as described herein.

Figure 4:
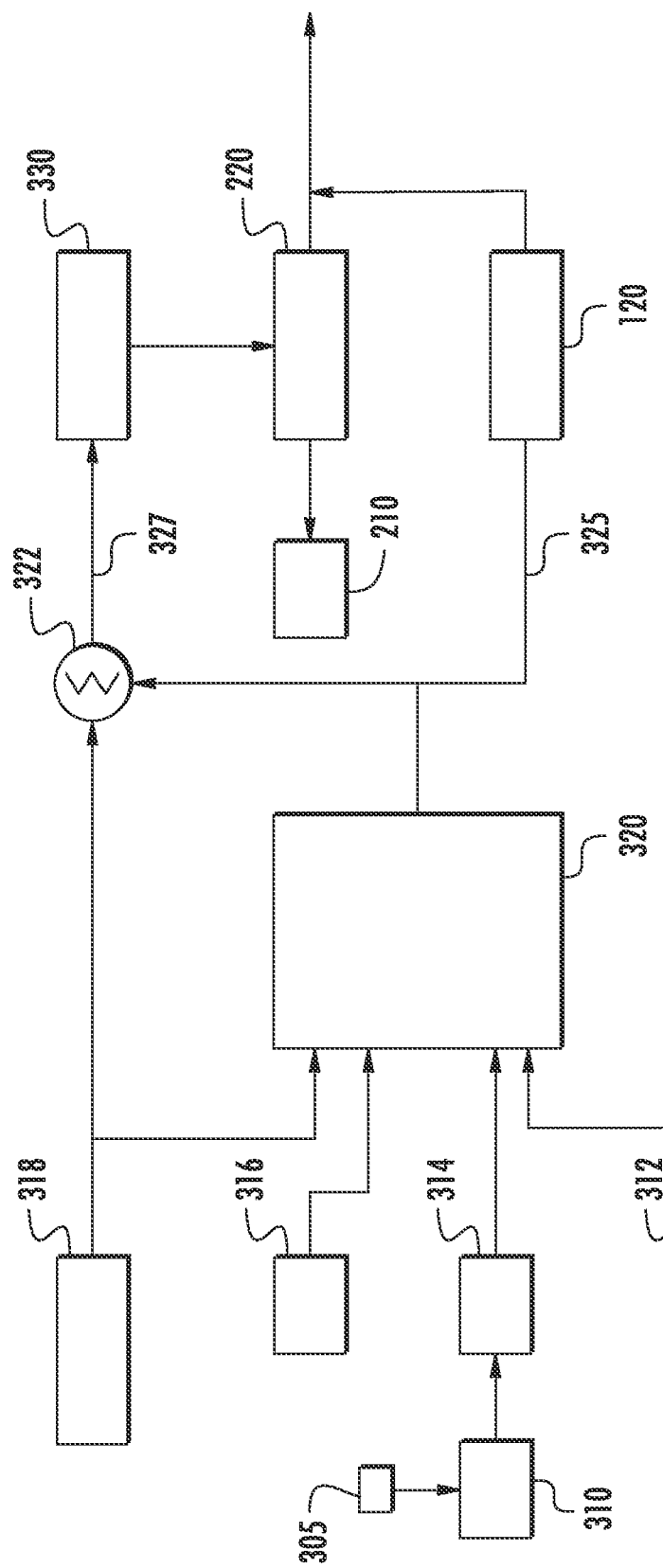
FIG. 4 depicts an example control system according to example embodiments of the present disclosure.

FIG. 4 depicts an example control scheme 300 implemented by the control system 250 according to example embodiments of the present disclosure. The control scheme 300 includes a state of charge adjustment module 310, a renewable energy control module 320, and a charge control module 330.

The state of charge adjustment module 310 can be configured to obtain data indicative of anticipated weather conditions 305 for a predetermined time period, such as 15 minutes of future weather data. For instance, the state of charge adjustment module 310 can receive data indicative of wind speed for a predetermined time period. The state of charge adjustment module 310 can determine a future output requirement for the energy storage system based on the data indicative of future weather conditions. For instance, the state of charge adjustment module 310 can determine that the future output requirement for the energy system will increase relative to a current output requirement because the data indicative of weather conditions 305 indicates a drop in wind speed for the predetermined time period.

The state of charge adjustment module 310 can adjust the state of charge setpoint for the energy storage system based at least in part on the future output requirement. For instance, the state of charge adjustment module 310 can be configured to adjust the state of charge setpoint from a nominal setpoint to an adjusted setpoint 314. The nominal setpoint can be a state of charge setpoint selected to increase battery life of the energy storage system. For example, the nominal setpoint can be about 50%. As used herein, the use of the term "about" in conjunction with a numerical value is intended to refer to within 25% of the numerical value.

The adjusted setpoint 314 can be determined by the state of charge adjustment module 310 to accommodate the future output requirement. For instance, the adjusted setpoint 314 can be greater than the nominal setpoint when the future output requirement is increased relative to a current output requirement of the energy storage system. The adjusted setpoint 314 can be less than the nominal setpoint when the future output requirement is decreased relative to the current output requirement of the energy storage system.

The adjusted setpoint 314 can be provided to the renewable energy control module 320. The renewable energy control module 320 can determine a power command 325 based at least in part on the adjusted setpoint 314. The power command can be used to control the production of energy by the wind turbine 120.

More particularly, the renewable energy control module 320 can receive the adjusted setpoint 314 as well as a signal 316 indicative of the actual state of charge of the energy storage system. The renewable energy control module 320 can receive other signals, such as a signal 318 indicative of an output power requirement of the renewable energy system and a signal 312 indicative of the maximum output power capability of the wind turbine. The signal 318 can be based on the desired output power of the renewable energy system for a given time period. The signal 312 can be indicative of the maximum output power capability of the wind turbine for the given weather conditions (e.g. wind speed).

The renewable energy control module 320 can generate the power command 325 based at least in part on a comparison of the adjusted setpoint 314 and the signal 316 indicative of the current state of charge of the energy storage system. If the adjusted setpoint 314 is greater than the signal 316 indicative of the current state of charge of the energy storage system, the power command 325 can be determined based on the maximum output power capability of the wind turbine for the given weather conditions as determined from signal 312. For instance, the power demand 325 can be equal to the maximum output power capability of the wind turbine. Otherwise, the power command 325 can be based on the signal 218 indicative of desired output power of the renewable energy system.

The power command 325 can be provided to summing node 322 which can determine a difference (e.g. error) between the power command 325 and the signal 318 indicative of the desired output power for the renewable energy system to generate a charge command 327 for the charge control module 330. When the power command 325 is equal to or nearly equal to the signal 318 indicative of the desired output power for the renewable energy system (e.g. the adjusted setpoint 314 is less than the signal 316 indicative of the current state of charge of the renewable energy system), the charge command 327 provided to the charge control module 330 can control the converter 220 to maintain the battery energy storage devices 210 at their current state of charge.

When the power command 325 is greater than the signal 318 indicative of the desired output power for the renewable energy system (e.g. the adjusted setpoint 314 is greater than the signal 316 indicative of the current state of charge of the renewable energy system), the charge command 327 provided to the charge control module 330 can control the converter 220 to increase the state of charge of the battery energy storage devices 210. For instance, the charge control module 330 can control the converter 220 to use the excess energy generated by the wind turbine 120 to charge the energy storage devices 210 to increase the state of charge. In this way, the charge control module 330 can control the delivery of power to and/or from the energy storage system by delivering power generated by the renewable energy system that is in excess of the output power requirement for the renewable energy system to increase the state of charge of the energy storage system.

Figure 5:
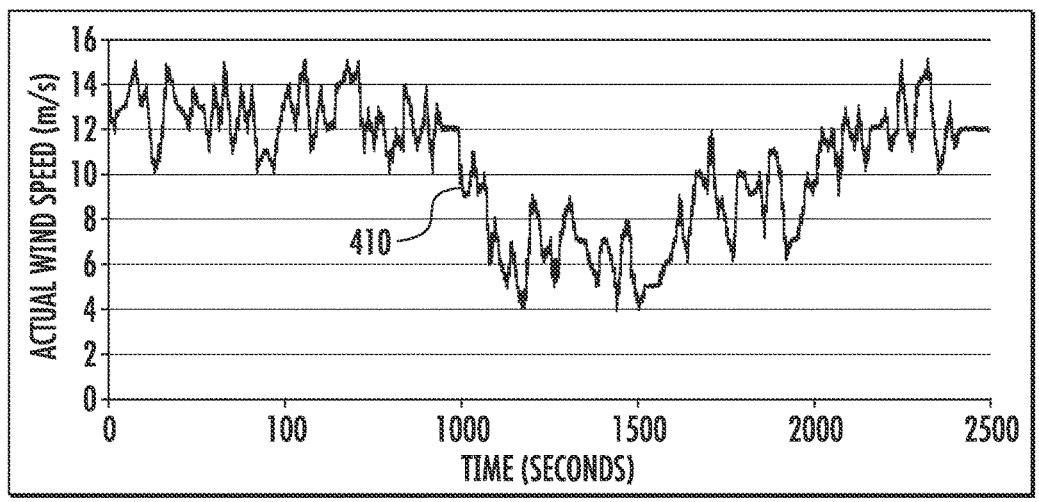
FIG. 5 depicts a graphical representation of wind speed over time.
Figure 6:
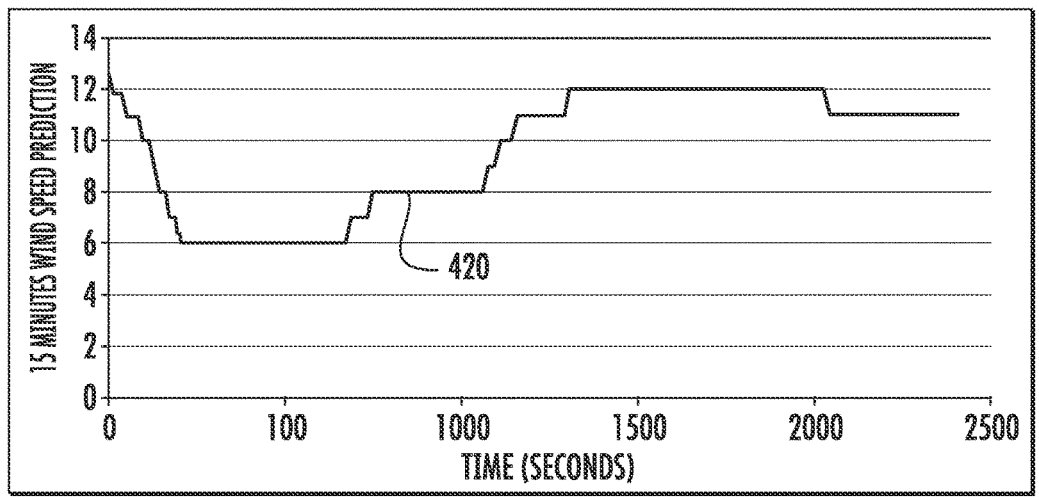
FIG. 6 depicts a graphical representation of data indicative of anticipated wind speed over time.

As an example, FIG. 5 depicts a curve 410 representing actual wind speed conditions over time for a wind turbine power generation system. FIG. 5 plots time along the abscissa and wind speed along the ordinate. As demonstrated, a dip in wind speed occurs at time t=1000. FIG. 6 depicts a graphical representation 420 of data indicative of anticipated wind conditions. FIG. 6 plots time along the abscissa and anticipated wind speed along the ordinate. As shown, the data indicates a future drop in wind speed at t=0.

Figure 7:
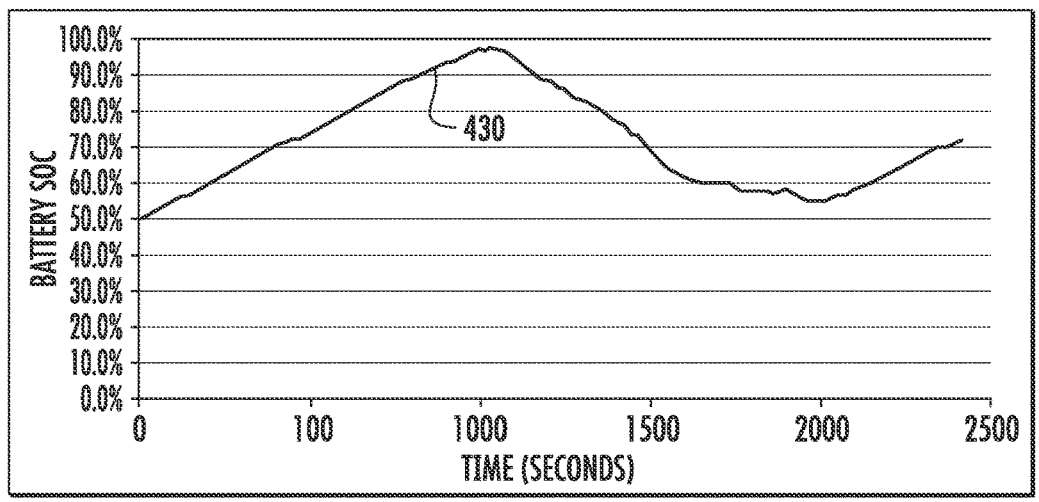
FIG. 7 depicts a graphical representation of control of the state of charge of an energy storage system based on data indicative of anticipated weather conditions according to example embodiments of the present disclosure.

FIG. 7 depicts a graphical representation 430 of the state of charge of an example energy storage system stored in accordance with the example embodiments of the present disclosure. FIG. 7 depicts time along the abscissa and state of charge along the ordinate. As shown, when the data indicative of anticipated wind conditions indicates a future drop in wind speed at time t=0, the state of charge of the energy storage system begins to increase to accommodate the future drop in wind speed. At time t=1000 when the actual drop in wind speed occurs, the energy storage system can begin to discharge energy to supplement the energy production of the renewable energy system. As demonstrated in FIG. 7, because the state of charge was increased based on the data indicative of anticipated wind conditions, the energy storage system was able to fully accommodate the drop in wind speed without deviating below about 50% state of charge.

Figure 8:
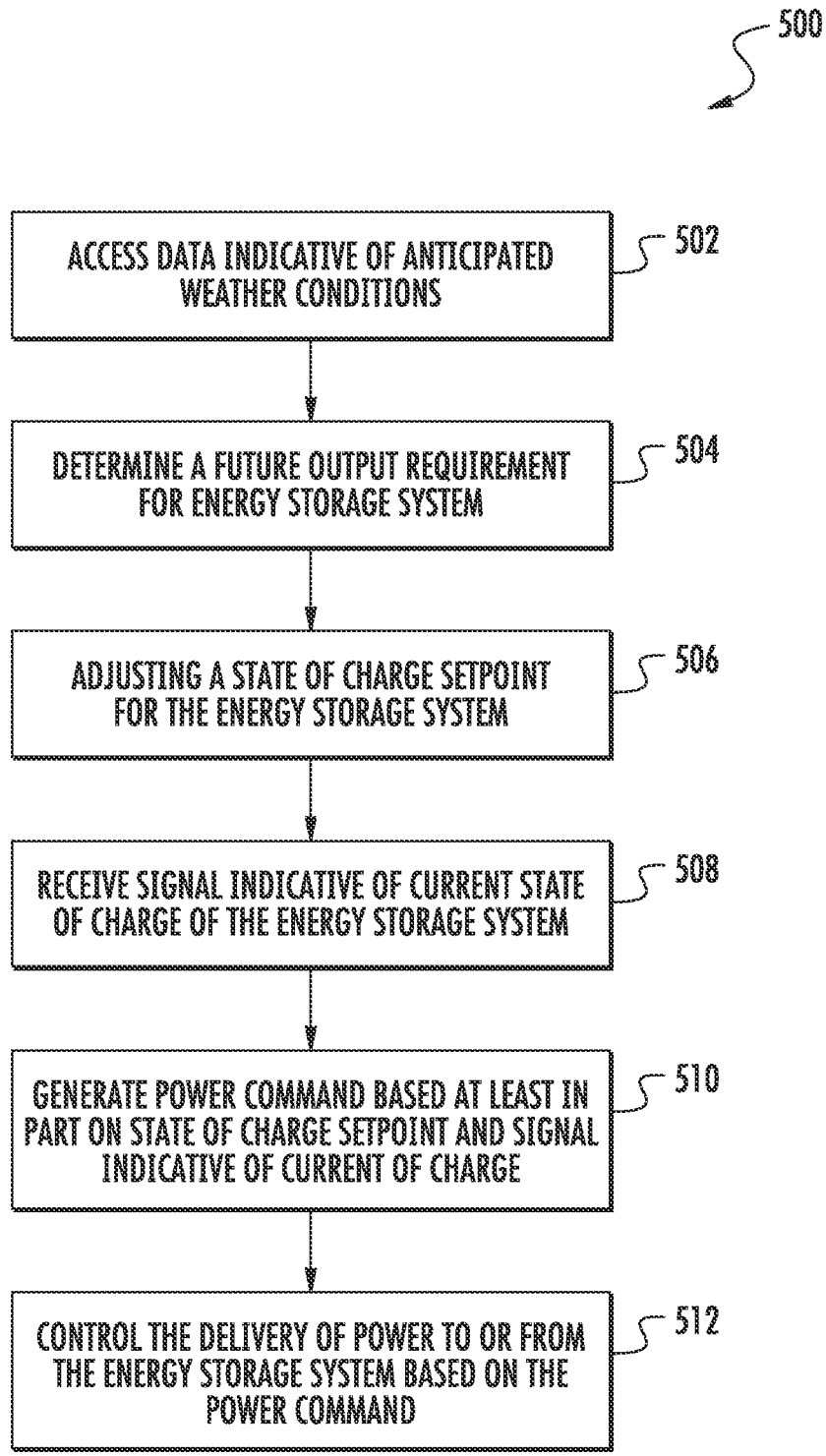
FIG. 8 depicts a flow diagram of an example method according to example embodiments of the present disclosure.

FIG. 8 depicts an example method (500) for controlling an energy storage system according to example embodiments of the present disclosure. The method (500) can be implemented by one or more control devices, such as one or more of the control devices depicted in FIG. 3. In addition, FIG. 8 depicts steps performed in a particular order for purposes of illustration and discussion. Those of ordinary skill in the art, using the disclosures provided herein, will understand that the various steps of any of the methods disclosed herein can be modified, adapted, rearranged, omitted, and/or expanded in various ways without deviating from the scope of the present disclosure.

At (502), the method includes accessing data indicative of anticipated weather conditions. For instance, data indicative of anticipated wind conditions for a wind turbine system can be accessed. The data can be for a predetermined time period, such as for the next incremental fifteen minutes or other suitable time period. Preferably, the predetermined time period is selected to be sufficiently close to the current time so that the anticipated weather conditions are more accurately predictive of the weather conditions.

At (504), a future output requirement for the energy storage system is determined based at least in part on the data indicative of the anticipated weather conditions. For instance, when the data indicative of the future weather conditions provides for a decrease in wind speed, a future output that is greater than the current output of the energy storage system can be determined. When the data indicative of future weather conditions provides for an increase in wind speed, a future output requirement that is less than the current output of the energy storage system can be determined.

At (506), a state of charge setpoint for the energy storage system can be adjusted based at least in part on the future output requirement. For instance, the state of charge setpoint can be adjusted from a nominal setpoint to an adjusted setpoint. The nominal setpoint can be selected to increase life of the energy storage system. For instance, the nominal setpoint can be about 50%. The adjusted setpoint can be greater than the nominal setpoint when the future output requirement is greater than a current output requirement of the energy storage system. The adjusted setpoint can be less than the nominal setpoint when the future output requirement is less than a current output requirement of the energy storage system.

The delivery of power to or from the energy storage system can be controlled based at least in part on the state of charge setpoint. For instance, at (508) the method can include receiving a signal indicative of the current state of charge of the energy storage system. At (510), the method can include generating a power command for the renewable energy system based at least in part on the signal indicative of the current state of charge and the state of charge setpoint. As an example, the power command can be equal to a desired output power for the renewable energy system when the current state of charge is greater than the state of charge setpoint. The power command can be equal to or determined based at least in part on a maximum output power for the renewable energy system when the current state of charge is less than the state of charge setpoint.

At (512), the method includes controlling the delivery of power to or from the energy storage system based on the power command. For instance, when the power command is greater than desired output power for the renewable energy system, the energy storage system can be controlled to deliver the power generated by the renewable energy system in excess of the output power requirement to increase the state of charge of the energy storage system.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an energy storage system associated with a power generation system, comprising:
accessing, by one or more control devices, data indicative of anticipated weather conditions for a predetermined time period;
determining, by the one or more control devices, a future output load requirement of the energy storage system for the predetermined time period based at least in part on the data indicative of the anticipated weather conditions;
increasing, by the one or more control devices, a state of charge setpoint for the energy storage system from a nominal setpoint to an increased setpoint based at least in part on the future output load requirement when the anticipated weather conditions indicate that the future output load requirement will increase so as to accommodate the future output load requirement; and
controlling, by the one or more control devices, the delivery of power to or from the energy storage system based at least in part on the increased setpoint.

2. The method of claim 1, wherein the increased setpoint is greater than the nominal setpoint when the future output load requirement is determined to be increased relative to a current output requirement of the energy storage system.

3. The method of claim 1, wherein controlling, by the one or more control devices, the delivery of power to or from the energy storage system further comprises:
receiving, by the one or more control devices, a signal indicative of the current state of charge of the energy storage system; and
generating, by the one or more control devices, a power command for the power generation system based at least in part on the signal indicative of the current state of charge of the energy storage system and the state of charge setpoint.

4. The method of claim 3, further comprising determining the power command based at least in part on a maximum output power for the power generation system when the state of charge setpoint is greater than the current state of charge of the energy storage system.

5. The method of claim 1, wherein controlling, by the one or more control devices, the delivery of power to or from the energy storage system further comprises delivering power generated by the power generation system that is in excess of an output power requirement for the power generation system during the predetermined time period to the energy storage system to increase the state of charge of the energy storage system.

6. The method of claim 1, wherein the power generation system comprises a wind turbine system.

7. The method of claim 6, wherein the energy storage system comprises a battery energy storage system.

8. The method of claim 6, further comprising:
operating the wind turbine system above rated power when wind conditions are within predefined ranges;
extracting extra power via the wind turbine system; and
storing the extra power in the energy storage system up to a maximum available capacity.

9. A control system for controlling an energy storage system associated with a renewable energy system, the control system comprising:
a state of charge adjustment module implemented by one or more control devices, the state of charge adjustment module configured to:
determine a future output load requirement of the energy storage system for a predetermined time period based at least in part on data indicative of anticipated weather conditions; and
increase a state of charge setpoint for the energy storage system from a nominal setpoint to an increased setpoint based at least in part on the future load requirement when the anticipated weather conditions indicate that the future output load requirement will increase so as to accommodate the future output load requirement;
a renewable energy control module implemented by the one or more control devices, the renewable energy control module configured to generate a power command for the renewable energy system based at least in part on the state of charge setpoint and a current state of charge for the energy storage system; and
a charge control module implemented by the one or more control devices, the charge controller configured to control the delivery of power to or from the energy storage system based at least in part on the increased setpoint.

10. The control system of claim 9, wherein the state of charge adjustment module is configured to increase the state of charge setpoint from a nominal setpoint to an increased setpoint, the increased setpoint being greater than the nominal setpoint when the future output requirement of the energy storage system is greater than a current output requirement of the energy storage system.

11. The control system of claim 9, wherein the renewable energy control module is configured to generate the power command based at least in part on a maximum output power for the renewable energy system when the state of charge setpoint is greater than the current state of charge of the energy storage system.

12. The control system of claim 9, wherein the renewable energy system comprises a wind turbine system, the one or more operations further comprising:
operating the wind turbine system above rated power when wind conditions are within predefined ranges;
extracting extra power via the wind turbine system; and
storing the extra power in the energy storage system up to a maximum available capacity.

13. A wind turbine system, comprising:
a wind driven generator;
a power converter coupled to the wind driven generator, the power converter comprising a DC bus;
a battery energy storage system coupled to the DC bus of the power converter, the battery energy storage system comprising one or more battery cells; and
a control system configured to control the delivery of power to or from the battery energy storage system based at least in part on a state of charge setpoint, the control system configured to perform one or more operations, the one or more operations comprising:
determining a future output load requirement of the battery energy storage system for a predetermined time period based at least in part on data indicative of anticipated weather conditions; and
increasing the state of charge setpoint for the battery energy storage system from a nominal setpoint to an increased setpoint based at least in part on the future output load requirement when the anticipated weather conditions indicate that the future output load requirement will increase so as to accommodate the future output load requirement.

14. The wind turbine system of claim 13, wherein the data indicative of the anticipated weather conditions comprises data indicative of wind speed.

15. The wind turbine system of claim 14, wherein the control system is configured to increase the state of charge setpoint when the data indicative of the wind speed indicates that the wind speed will decrease during the predetermined time period.

16. The wind turbine system of claim 13, wherein the control system is configured to control energy production by the wind driven generator based at least in part on a maximum output power for the wind driven generator when a current state of charge of the battery energy storage system is less than the state of charge setpoint.

17. The wind turbine system of claim 13, wherein the control system is configured to deliver power generated by the wind generator that is in excess of an output power requirement for the renewable energy system during the predetermined time period to the battery energy storage system to increase the state of charge of the battery energy storage system.

18. The wind turbine system of claim 13, further comprising:
   operating the wind turbine system above rated power when wind conditions are within predefined ranges;
   extracting extra power via the wind turbine system;
   storing the extra power in the energy storage system up to a maximum available capacity.

* * * * *